United States Patent [19]

Strelnieks

[11] Patent Number: 5,019,424
[45] Date of Patent: May 28, 1991

[54] METHOD OF PRODUCING A DECORATIVE CONTAINER

[75] Inventor: John Strelnieks, Indianapolis, Ind.

[73] Assignee: Moonflower Vases Company, Indianapolis, Minn.

[21] Appl. No.: 283,292

[22] Filed: Dec. 12, 1988

[51] Int. Cl.⁵ .......................... B05D 3/12; B05D 5/06; B05D 7/24

[52] U.S. Cl. .................... 427/264; 427/266; 427/443

[58] Field of Search ............... 427/264, 266, 269, 270, 427/287, 443, 277; 428/34.4, 34.7; 215/12.2, DIG. 6; 434/82

[56] References Cited

U.S. PATENT DOCUMENTS

| | | | |
|---|---|---|---|
| 1,596,017 | 8/1926 | Harnisch | 427/264 |
| 1,817,783 | 8/1931 | Tsuyuki | 427/443 X |
| 2,015,903 | 10/1935 | Magee et al. | 156/663 X |
| 2,043,025 | 6/1936 | Wooles | 156/663 X |
| 2,346,579 | 4/1944 | Henderson | 427/287 X |
| 4,096,299 | 6/1978 | Stewart | 427/264 |

Primary Examiner—Evan Lawrence
Attorney, Agent, or Firm—Woodard, Emhardt, Naughton Moriarty & McNett

[57] ABSTRACT

A decorative container is made by dipping into baths of molten wax, different colors of wax being provided in different baths for successive dipping to provide a multi-colored laminated wax coating on the container. Decorative designs at various locations on the container are formed by carving the wax and turning the laminae outward various degrees, and entirely in use instances, inverting the layers to provide various colors of design.

11 Claims, 3 Drawing Sheets

METHOD OF PRODUCING A DECORATIVE CONTAINER

BACKGROUND OF THE INVENTION

This invention relates generally to decorative containers, and more particularly to a method for producing a glass container with a decorative wax exterior.

DESCRIPTION OF THE PRIOR ART

Various techniques for decorating containers are known. For glass jars, some such methods include painting, glazing, affixing decals, wrapping with paper or fabric labels or covers. It is an object of my invention to provide a new decorative effect for glass jars, and a suitable method for producing it.

SUMMARY OF THE INVENTION

A container of rigid material has a wax exterior surface having decorative designs in a variety of colors formed in its surface. It is achieved by dipping the jar in a succession of baths of different colors of molten wax to achieve multiple overlying layers of wax. Dipping may be followed by carving in the wax to create the decorative designs, and folding out, twisting, or inverting the layers in portions of the design to produce the decorative effects.

DESCRIPTION OF THE PREFERRED EMBODIMENT

Figure 1:
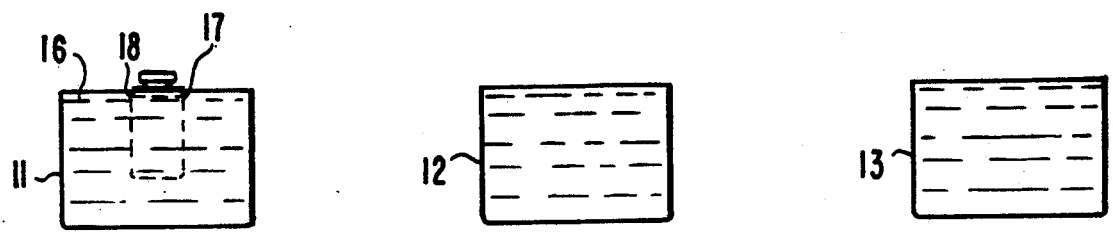
FIG. 1 is a schematic diagram of the process.
Figure 2:
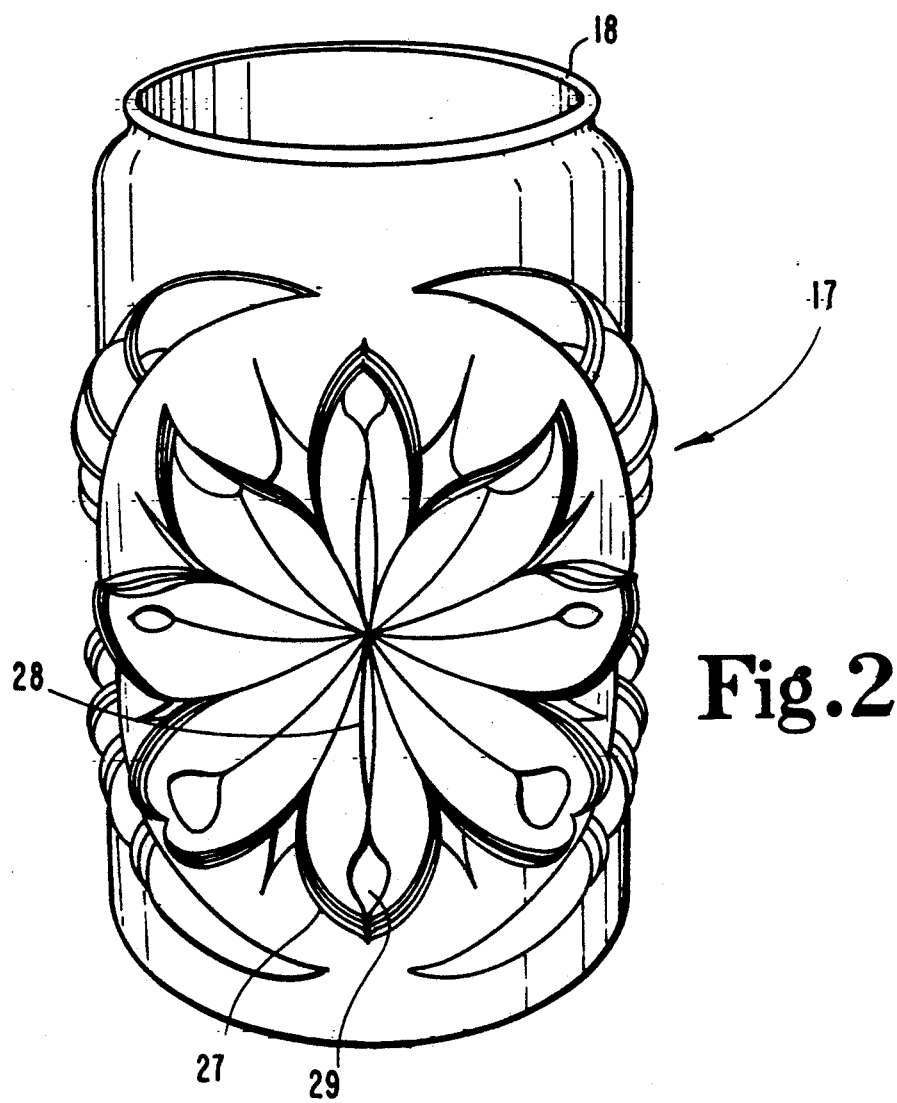
FIG. 2 is a pictorial view of the resulting product.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, FIG. 1 shows three vats 11, 12 and 13, each of them containing molten wax to a surface such as at 16. The number of vats in FIG. 1 was chosen for illustrative purposes only, and is not meant to limit the color combinations contemplated by this invention. The color of wax in each is different. For example, they may be pink, white and red, in that order, in the vats 11, 12, and 13, respectively. An example of suitable wax is candle wax obtainable from Amoco Oil Company in ten pound bars. The temperature in the vats is maintained at approximately 147° F.

A conventional glass jar, such as 17, at room temperature is first dipped into the vat 11. It is held in there for approximately one second and then removed. The wax which has adhered to the jaw is allowed to cool in the ambient air so as not to drip. The time for cooling to occur depends on room temperature but typically, the cooling step lasts between 15 and 45 seconds. Additional dippings into vat 11 take place followed by additional coolings until the thickness of the monochromatic layer 21 is approximately 0.03 inches. The thickest coat is obtained if the jar is pulled immediately out of the vat after dipping so as to prevent the previous wax coat from melting or softening. Once the layer 21 adhered to the jaw is sufficiently thick, the jaw can then be moved to vat 12 and dipped into that vat.

The jar is then removed from vat 12 and held sufficiently for the second layer of wax 22 thereon to solidify. If the thickness of that layer 22 is sufficient, the jar can then be moved to the third vat 13 and dipped and removed and held for the third layer of wax 23 to solidify. Then the jar is moved back to vat 12 and dipped and removed and held for the fourth layer of wax 24 to solidify thereon. By this time, there are four distinct layers of wax coating the exterior of the jar, the first 21 being pink, the next 22 being white, the next 23 being red, and the last 24 being white. It should be understood that the jar can be dipped and removed from each vat as often as needed to obtain the desired layer thickness.

In each case, the jar is dipped sufficiently deep for the exterior wall to be covered almost entirely to the rim 18 at the top of the jar, but without permitting wax to flow into the jar. It is helpful to achieve this exclusion of flow if there is a bead at the top of the jar as at 19 in FIG. 3.

It is desirable that each layer be approximately 0.03 inches thick throughout the height of the jar from the bottom 20 to the bead 19. Therefore, each of the layers 21, 22, 23 and 24 will be at least 0.03 inches thick throughout the height of the wall 26 of the jar. In order to do this, it may be necessary to repeat the dip, remove, hold and cool steps several times for a given color of wax, before moving on to the next vat. Typically, each layer represents 5 to 6 dip and cool steps, more or less.

Figure 3:
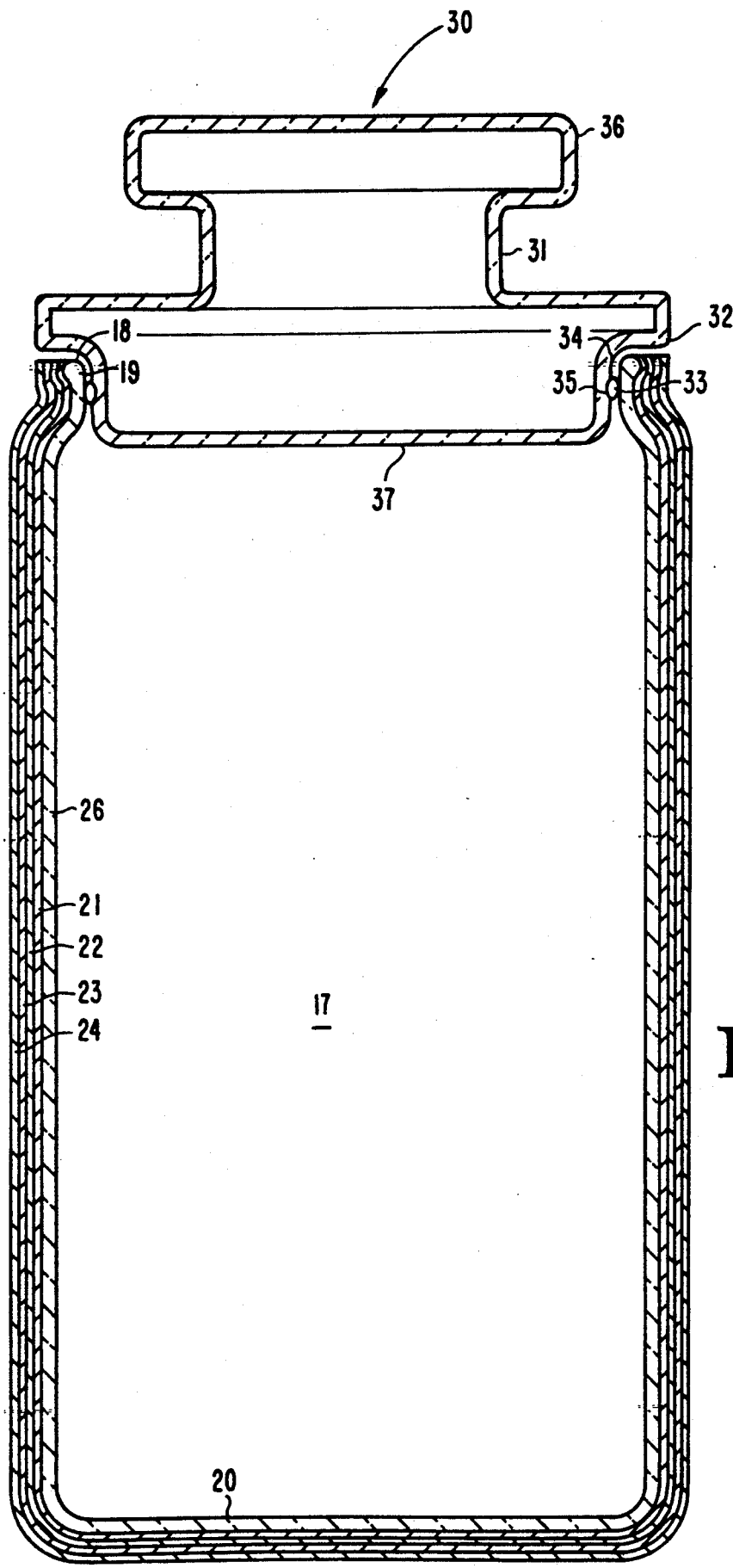
FIG. 3 is a cross section through the decorative jaw when dipping is completed but before carving. This figure shows the lid which may be used as a grasping means during the dipping of the container into the wax.

A means for grasping the jar during the dipping, cooling and holding process described above is desirable. The grasping means should be such that the adherence of each wax coat is undisturbed and a smooth coat results. Additionally, any grasping means must hold onto the jar snugly to prevent losing the jar into a vat of wax. The hollow glass lid 30 of FIG. 3 is a suitable grasping means. The concave surface 34 fits down into the jar. The entire surface between the bottom 37 of the lid and the lip 32 of the lid is of smaller outer diameter than the inner diameter of the opening of the jar. An elastomeric seal ring 33 (such as a rubber O-ring, for example) which sits in a groove 35 prevents the lid from slipping out of the jar as a result of the jar and wax weight during the dipping, holding and cooling process. Having a larger outer diameter than the inner diameter of the jar, the rubber O-ring 33 is radially compressed upon insertion of the lid into the jar. The O-ring resists the radial compression by exerting a force against the inner jar wall 26. This force, aided by the the frictional nature of the rubber, seals the lid into the jar until such time as a greater force is applied to the open the jar. Being of an outer diameter greater than the inner diameter of the jar, the lip 32 of the lid prevents the lid from slipping so far into the jar that it cannot be easily removed. Groove 31, bounded on either side by the larger diameter flange 36 and the larger diameter lip 32, allows for grasping the jar securely during the dipping, holding and cooling process. When grasped by the flange 36, the fingers, tongs or other implement, fit into groove 31, thereby enabling the easy handling of the jar.

Figure 4:
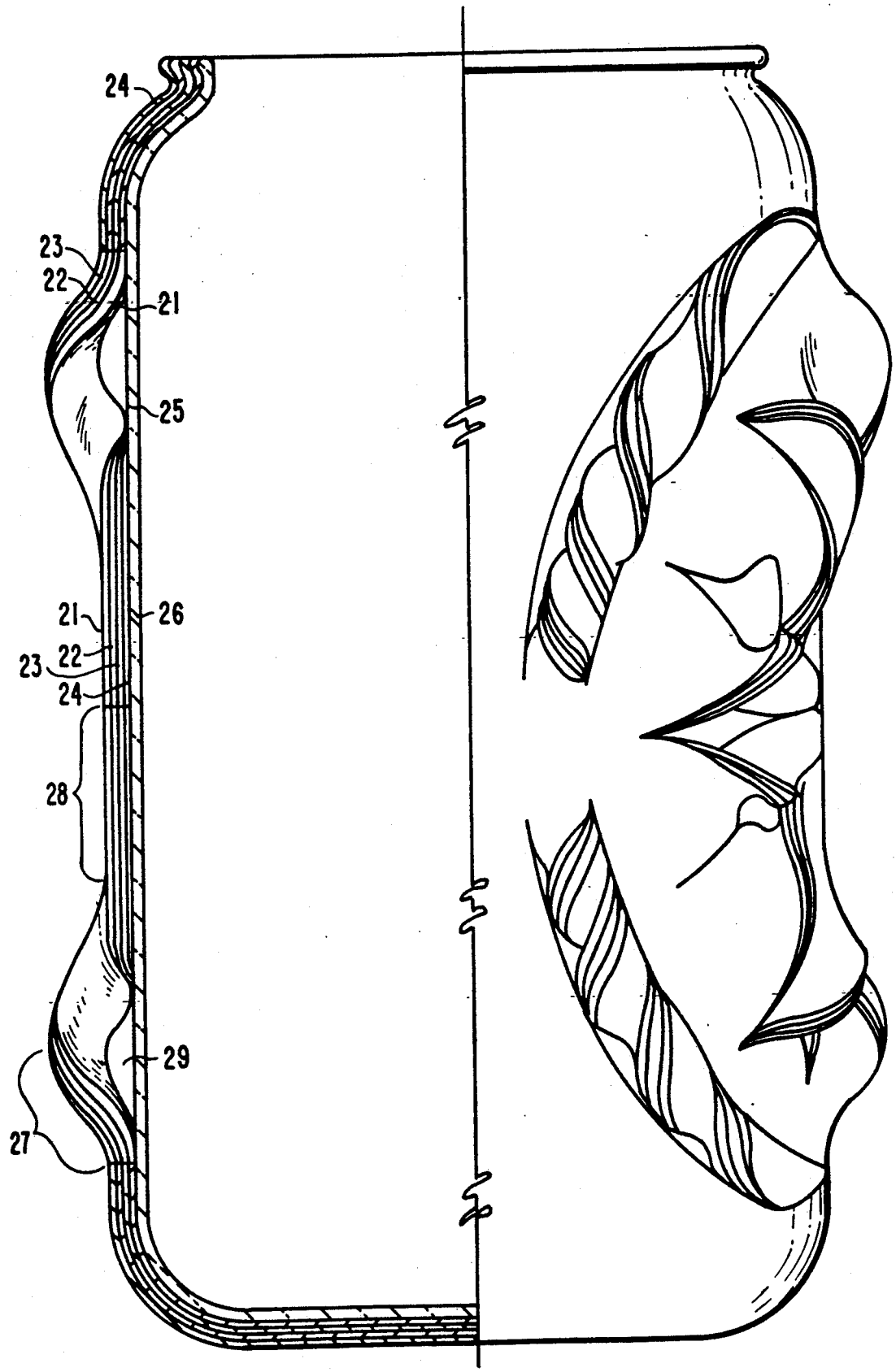
FIG. 4 is a side elevational view but half sectioned through the decorative jaw when completed and after carving and turning out the inner most layer of wax of the carvings to make the decorative twists.

Following the adherence of the four layers of wax of different colors on the jar, it is then carved with a knife to produce the design thereon. This is typically done by cutting through the wax to the outer surface of the wall 26 of the glass jar. Then the wax is turned outward as at location 27 in FIG. 4 to expose at least the edges of the inner layers at the cut to provide a multi-colored edge. The wax can be carved to facilitate pulling a strip of wax from the surface of the jar and twisting it to produce an inversion of the layers as at location 28 in FIG. 4 where the layer 24 is at the inside touching the glass with the succeeding layers 23, 22 and 21 being outboard thereof, with layer 21 being at the outside. At this location, the outside of the decoration will be pink, whereas the inside (visible through the glass at location 28) will be white, in contrast to the pink appearance of the interior of the wax in the other areas where it has not been turned outward or twisted.

Depending upon the design used, there may be areas of the glass where, when viewed from the inside, a clear view of the exterior would exist. This could be at location 29 in FIG. 4, for example, where the wax is turned outward completely and up. In that case, if one were to install a candle on the inside of the jar, one could see the candle light clearly through the transparent wall of the glass, the decorative wax which has been turned out from the space providing a decorative framing for the "window" in the jar.

During the carving of the wax, it is essential that it not be so hard as to crack and flake or break off. For that purpose, it may be necessary to use hot water or a light bulb or some other heat source inside or outside the jar to warm the wax sufficiently that it can be carved without fracture. An alternative is to immerse the whole waxed container in a vat (bucket or the like) of warm or hot water which may be at a temperature from 130° to 150° F. The container would be held in the water long enough to provide the desired softening of the wax to permit carving, but without melting the wax sufficiently for the layers to merge of slump and, worse yet, become liquid.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A method of producing a decorative container comprising the steps of:
    dipping a rigid container in a first bath of molten colored wax to adhere a layer of said wax to said container;
    removing the container from the bath;
    holding the container out of the bath long enough for the adhered layer of wax on the container to solidify;
    dipping the wax container into a second bath of molten wax of a second color to adhere a second layer of wax to the solidified first layer of wax;
    removing the waxed container from the second bath;
    holding the container out of the bath long enough for the second layer of wax to solidify; and
    carving designs completely through at least the second layer of wax.

2. The method of claim 1 wherein the container has a closed bottom and open top and the dipping steps further comprise:
    dipping the container with bottom down; and
    dipping the container in each bath long enough to adhere layers that are at least 0.030 inches thick at the bottom of the container.

3. The method of claim 1 wherein the container has a closed bottom and open top and wherein the dipping steps further comprise:
    dipping the container with bottom down, the method further comprising:
    repeating the dipping into the first bath, the dipping into the second bath and the holding steps often enough to adhere layers of each color that are at least 0.030 inches thick each, at the bottom of the container.

4. The method of claim 1 and further comprising the post-carving step of:
    inverting the layers in at least some of the carved design locations so that said first layer is outside said second layer at said locations.

5. The method of claim 1 and further comprising the steps of:
    precluding wax accumulation inside the container;
    carving said designs entirely through said first and second layers; and
    inverting the layers in at least some of the design locations.

6. The method of claim 5 wherein the container material transmits light through it so that at least part of the design can be seen from the inside of the container.

7. A method of producing a decorative container comprising the steps of:
    dipping a rigid container in a bath of molten colored wax to adhere a layer of said wax to said container;
    removing the container from the bath;
    holding the container out of the bath long enough for the adhered layer of wax on the container to solidify;
    dipping the waxed container into a second bath of molten wax of a second color to adhere a second layer of wax to the solidified first layer of wax;
    removing the waxed container from the second bath;
    holding the container out of the bath long enough for the second layer of wax to solidify;
    carving designs in at least the second layer of wax;
    dipping the waxed container into a third bath of molten wax of a third color to adhere a third layer of wax to the second layer after holding the container out of the second bath long enough for the second layer of wax to solidify;
    removing the waxed container from the third bath;
    holding the waxed container out of the bath long enough for the third layer of wax to solidify;
    dipping the waxed container into said first bath of molten wax to adhere a fourth layer of wax to the third layer;
    removing the waxed container from the fourth bath;
    holding the container out of the bath long enough for the fourth layer of wax to solidify; and
    carving designs in at least the fourth, third and second layers of wax.

8. The method of claim 7 and further comprising the step of:
    carving designs in the four layers of wax.

9. The method of claim 8 and further comprising:
folding out the laminae of layers of wax in at least one of the locations of carved designs to expose at least the edges of the first, second and third layers of wax to view from the exterior.

10. The method of claim 9 and further comprising the step of:
folding the carved wax in at least one of the locations of a carved design sufficiently outward to provide a window in the wax layers of the container at that location.

11. The method of claim 10 and further comprising the step of:
twisting a strip of carved wax to provide a total inversion of the wax laminae whereby the first layers is exposed at the exterior of the container and the fourth layer faces the interior of the container.

* * * * *

UNITED STATES PATENT AND TRADEMARK OFFICE
CERTIFICATE OF CORRECTION

PATENT NO. : 5,019,424

DATED : May 28, 1991

INVENTOR(S) : John Strelnieks

It is certified that error appears in the above-identified patent and that said Letters Patent is hereby corrected as shown below:

Title page, [73] Assignee, after "Indianapolis", change "Minn." to --Ind.--.

Title page, [57] ABSTRACT, line 7, after ", and entirely in", change "use" to --some--.

Column 1, line 32, change "jaw" to --jar--.

Column 1, line 37, change "jaw" to --jar--.

Column 1, line 38, last occurrence of the word "of", change to --at--.

Column 2, line 11, change both occurrences of the word "jaw" to --jar--.

Column 2, line 62, delete the word "the" which is before "open".

Column 3, line 63, change "wax" to --waxed--.

Column 6, line 6, change "layers" to --layer--.

Signed and Sealed this

Twenty-second Day of September, 1992

Attest:

DOUGLAS B. COMER

Attesting Officer

Acting Commissioner of Patents and Trademarks